US00RE36351E

United States Patent [19]

Yamamoto et al.

[11] E Patent Number: Re. 36,351

[45] Reissued Date of Patent: Oct. 26, 1999

[54] FASTENER ASSEMBLY

[75] Inventors: Albert K. Yamamoto, Huntington Beach; Frank J. Cosenza, Santa Barbara, both of Calif.; James R. Potter, Bay Village, Ohio

[73] Assignee: Fairchild Holding Corporation, Dulles, Va.

[ * ] Notice: This patent issued on a continued prosecution application filed under 37 CFR 1.53(d), and is subject to the twenty year patent term provisions of 35 U.S.C. 154(a)(2).

[21] Appl. No.: 08/656,903

[22] Filed: Jun. 3, 1996

Related U.S. Patent Documents

Reissue of:

[64] Patent No.: 5,207,544
Issued: May 4, 1993
Appl. No.: 07/845,985
Filed: Mar. 4, 1992

U.S. Applications:

[63] Continuation of application No. 08/433,671, May 4, 1995, abandoned.

[51] Int. Cl.[6] ..... B60R 21/16; F16B 21/00

[52] U.S. Cl. ..... 280/728.2; 411/348; 24/453; 292/252; 280/731

[58] Field of Search ..... 411/347, 348, 411/552, 549; 280/728.2, 731, 728.1; 403/328, 325, 19, 20; 24/453, 606, 607, 628; 292/252

[56] References Cited

U.S. PATENT DOCUMENTS

| | | | |
|---|---|---|---|
| 2,402,925 | 6/1946 | Spooner | 411/348 |
| 2,487,084 | 11/1949 | Weiss | 411/347 |
| 2,901,804 | 9/1959 | Williams | 411/348 |
| 2,954,994 | 10/1960 | Beers | 403/20 |
| 3,043,563 | 7/1962 | Gray et al. | 411/348 X |
| 3,085,462 | 4/1963 | Myers | 411/348 |
| 3,186,196 | 6/1965 | Moberg | 292/252 X |
| 3,233,496 | 2/1966 | De Pew et al. | 411/348 |
| 3,773,352 | 11/1973 | Radke | 280/731 |
| 3,793,685 | 2/1974 | Knecht | 411/348 X |
| 3,980,327 | 9/1976 | Duran | 411/348 X |
| 4,111,477 | 9/1978 | Rigali | 292/252 |
| 4,785,144 | 11/1988 | Fosnaugh et al. | 200/61.55 |
| 4,793,631 | 12/1988 | Takada | 280/743 |
| 4,893,521 | 1/1990 | Ishida et al. | 74/552 |

(List continued on next page.)

FOREIGN PATENT DOCUMENTS

| | | | |
|---|---|---|---|
| 36853 | 8/1930 | France | 24/607 |
| 897080 | 3/1945 | France | 411/348 |
| 747277 | 1/1945 | Germany | 411/348 |
| 575355 | 2/1946 | United Kingdom | 411/348 |
| 971537 | 9/1964 | United Kingdom | 411/348 |

*Primary Examiner*—Rodney M. Lindsey
*Attorney, Agent, or Firm*—Sheppard, Mullin, Richter & Hampton LLP

[57] ABSTRACT

A fastener assembly for securing a first panel member to a second panel member in a spaced-apart relationship. The fastener comprises a tubular shank portion having first and second end portions, a cavity being formed in the shank portion. A first spring member is secured on the outside of the shank portion and has openings near the first end of the shank portion to enable steel ball members to protrude therefrom. Inside the shank portion cavity is a stepped pin member that is spring loaded and held in place by a combination of the shank portion spring ball retention feature and step angles formed on the pin member.

28 Claims, 4 Drawing Sheets

U.S. PATENT DOCUMENTS

| | | | |
|---|---|---|---|
| 4,913,461 | 4/1990 | Cuevas | 280/731 |
| 4,988,119 | 1/1991 | Hartmeyer | 280/743 |
| 5,005,860 | 4/1991 | Mori et al. | 280/731 |
| 5,011,181 | 4/1991 | Laucht et al. | 280/731 |
| 5,085,461 | 2/1992 | Shibata | 280/731 |
| 5,087,069 | 2/1992 | Corbett et al. | 280/731 |
| 5,176,400 | 1/1993 | McGuire et al. | 280/728.2 |
| 5,199,834 | 4/1993 | Seidl et al. | 411/5 |
| 5,228,362 | 7/1993 | Chen et al. | 74/552 |
| 5,235,146 | 8/1993 | Suzuki | 200/61.54 |
| 5,239,147 | 8/1993 | Allard et al. | 200/61.54 |
| 5,333,897 | 8/1994 | Landis et al. | 280/728 |
| 5,560,642 | 10/1996 | Davidson et al. | 280/731 X |
| 5,584,501 | 12/1996 | Walters | 280/731 X |
| 5,590,900 | 1/1997 | Duran et al. | 280/731 X |

FASTENER ASSEMBLY

Matter enclosed in heavy brackets [ ] appears in the original patent but forms no part of this reissue specification; matter printed in italics indicates the additions made by reissue.

*This is a continuation of reissue application Ser. No. 08/433,671, filed May 4, 1995, now abandoned.*

BACKGROUND OF THE INVENTION

1. Field of the Invention

The present invention relates to improvements in assembly line type fastener assemblies wherein the fastener can be both quickly installed and released.

2. Description of the Prior Art

Many systems wherein at least two members are mechanically joined require that the members be capable of being fastened together and separated quickly and simply for maintainability purposes. For example, in the assembly of an automotive airbag to the steering column and wheel, the air bag mechanism typically is attached by four screws that are threaded into tubular standoffs that are attached to a plate that the airbag is secured to. As the airbag is one of the last items to be assembled on the almost finished vehicle, its accessibility is very limited. Therefore the time required to assemble the airbag to the steering wheel assembly is longer than desired because the screws have to be inserted from behind the steering wheel. The convenience of installation is severely hampered due to the natural obstructions that accompany any automobile such as a gear selector lever, the turn signal stalk, the steering wheel post shroud and the proximity of the dashboard. The installation may also require the steering wheel to be rotated to a certain position in order to access all four holes; in addition the aligning of the screw to its mating threads in a blind application is difficult. The same problems occur during the check out cycle of a malfunction occurs or at a later time during normal servicing at the dealer's facility. The current practice of locating the holes for the airbag assembly and to install the four screws is slow and expensive.

The reduction in time required to remove the installed airbag, i.e., due to a mechanical defect or after deployment is more than desired due both to the absence of a trained mechanic who normally installs airbags and to the cramped quarters which prohibits the use of power tools. The current time consuming system thus requires rotation of the steering wheel to certain positions to provide access and the unloosening and removal of the four screws.

A number of fastener assemblies for joining two members together which does not require the use of a nut are available in the prior art. For example, U.S. Pat. No. 5,011,355 to Motoshige discloses a pushbutton type fastener which utilizes a stud assembly snap-fitted into one of two panels to be joined, a mating socket being snap fit to the other panel. The two components are secured together by pushing a stud in the stud assembly toward the socket. The stud assembly is released from the socket by rotating the stud enabling a spring to urge the stud out of its engagement with the socket.

Although the pushbutton fastener of the type illustrated in the Motoshige patent satisfactorily performs its function of releasably joining two panels together, the fastener requires a number of mechanical parts to perform its function, thus increasing its cost and complexity. In addition, certain applications such as the airbag installation/maintenance procedure noted hereinabove, requires access to the rear (non-head) portion of the fastener assembly to release it. Since the Motoshige type pushbutton fastener is releasable by rotating the head portion of the stud portion of the stud assembly, it would not be adaptable for use in that application.

What is therefore desired is to provide a pushbutton, or press fit, type fastener for releasably joining together two panels which is less complex, less expensive and wherein the fastener can be released by accessing the fastener at the end opposite the head of the stud.

SUMMARY OF THE PRESENT INVENTION

The present invention provides a fastener assembly for securing a first panel member to a second panel member in a spaced apart relationship. The fastener assembly comprises a tubular shank portion having first and second end portions and a cavity formed in said shank portion. A first spring member is secured on the outside of the shank portion, the shank portion having openings formed to enable hardened steel ball members to protrude therefrom. Inside the shank portion cavity is a stepped pin member spring loaded and held in place by a combination of the shank portion spring ball retention feature and step angles formed on the pin member. The ball members are in the retracted position until usage, held there by a first spring member. When the fastener is pushed into an aperture formed in the second panel member, the first spring member is compressed back toward the first end of said shank portion and moves away from the ball members it normally forces inward. As the fastener passes through the aperture, the ball members are still in the retracted position since the aperture diameter is approximately the same size as the inside diameter of the first spring member that previously contained it in the shank openings. When the fastener pushes through the aperture and beyond the ball members, a second spring member, positioned behind the pin member, pushes the pin forward and forces the ball members to expand radially, thus securing itself to the second panel member completing the installation. At this point, there is a compressive load between the retracted first spring on the panel member and the radially expanded locked ball members. To remove the fastener, a tool is inserted in a recess formed in said pin member and the pin is pushed axially backward toward the first end of said shank portion, compressing the second spring member and allowing the ball members to retract inwardly. As the ball members are retracted to the proper depth, the fastener exits the hole due to the compressed first spring ejection load and the first panel member is free to be removed. Simultaneously, the first spring member positions itself over the ball members to maintain them in the retracted position.

The present invention thus provides a novel pushbutton type fastener that requires fewer components and wherein the panels joined together by the fastener can be quickly released by accessing the fastener at the end opposite its head portion, a feature required in many applications.

The reduction in the number of components necessary to fabricate the fastener of the present invention increases reliability of the fastener while reducing its fabrication cost.

DESCRIPTION OF THE DRAWING

For a better understanding of the invention as well as other objects and further features thereof, reference is made to the following description which is to be read in conjunction with the accompanying drawing wherein.

DESCRIPTION OF THE INVENTION

Figure 1:
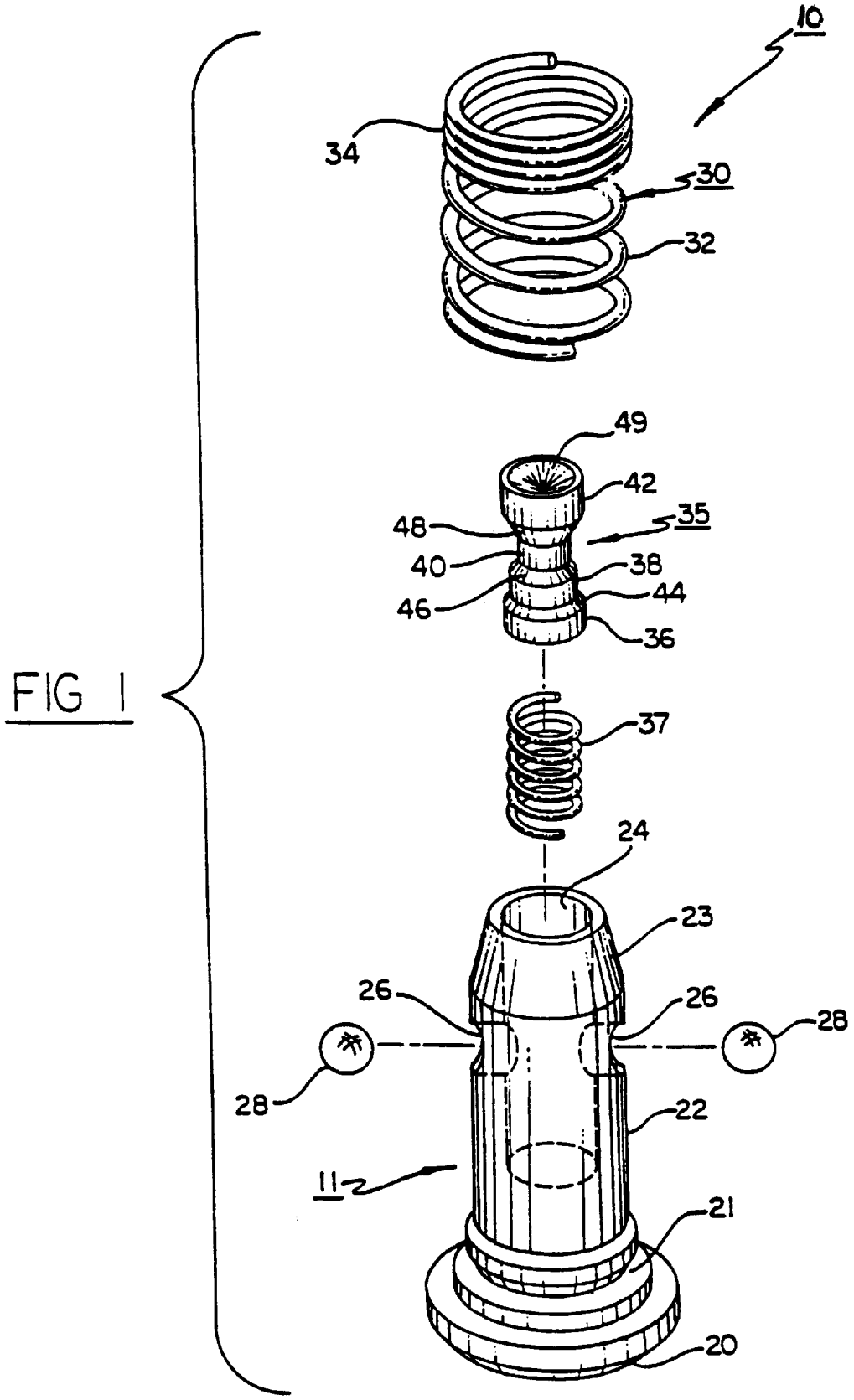
FIG. 1 is an assembly view of the fastener of the present invention.
Figure 2:
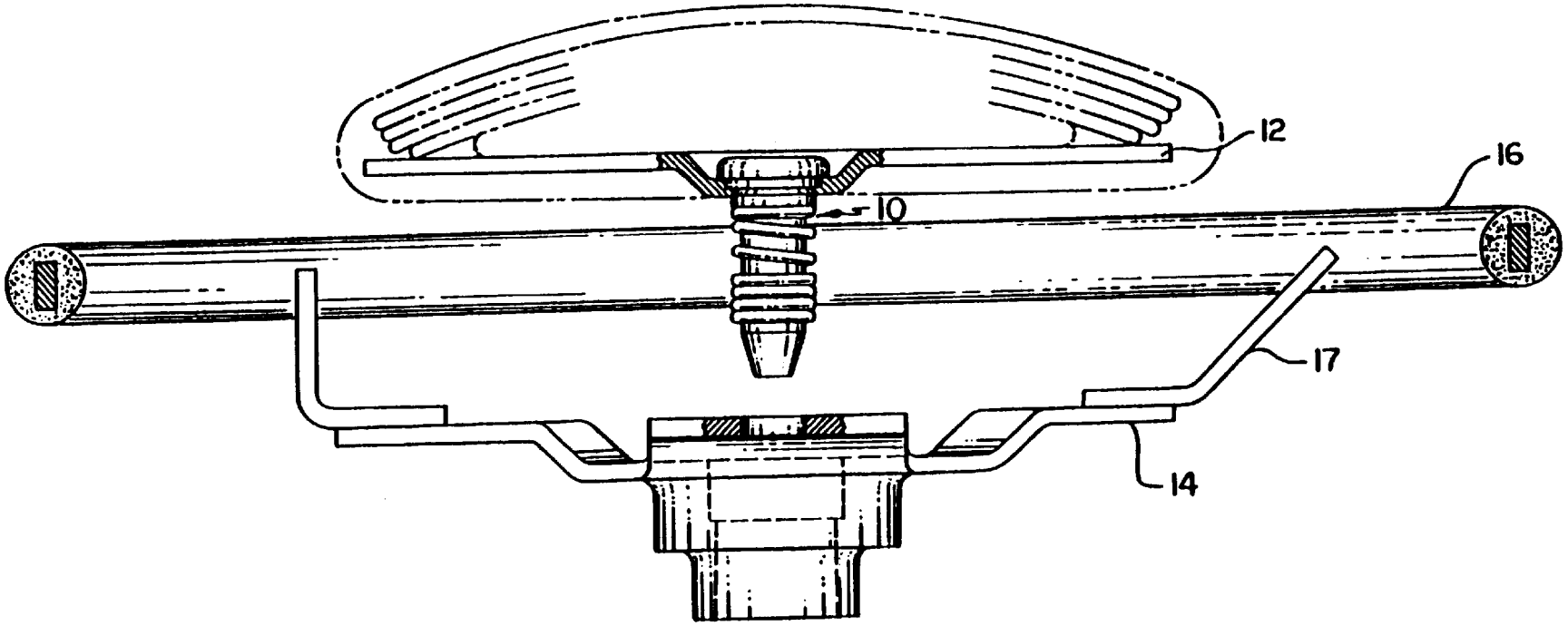
FIG. 2 illustrates the fastener of the present invention utilized to secure an air bag support plate member to a vehicle steering mounting support.

Referring now to the figures, an assembly view of a pushbutton type fastener 10 according to the present invention is illustrated in FIG. 1. While pushbutton fastener 10 can be utilized to join together various types of members, one important application is that shown in FIG. 2 wherein an air bag support plate member 12 is secured to a vehicle steering wheel support member 14, member 14 supporting steering wheel 16 via plate member 17. As has been noted hereinabove, it has been determined that for installation and repair purposes it is advantageous to enable access to the fastener 10 through its rear, or non-head portion end, due to the nature of the airbag installation.

Figure 3A:
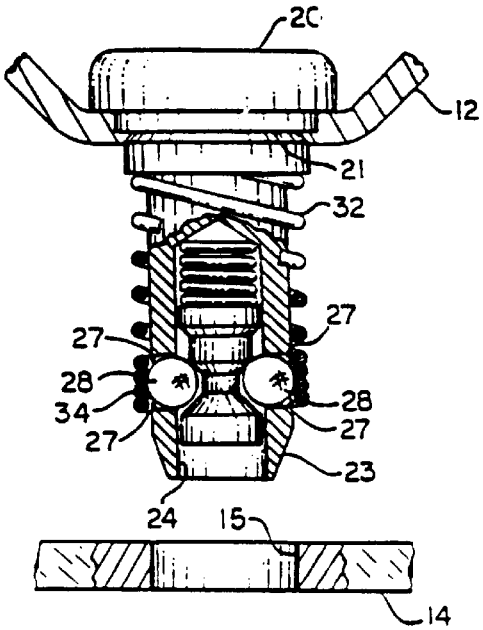
FIGS. 3(a) through 3(c) illustrate the steps of securing two plate members together and FIG. 3(d) illustrates how the two plate members are released.
Figure 3B:
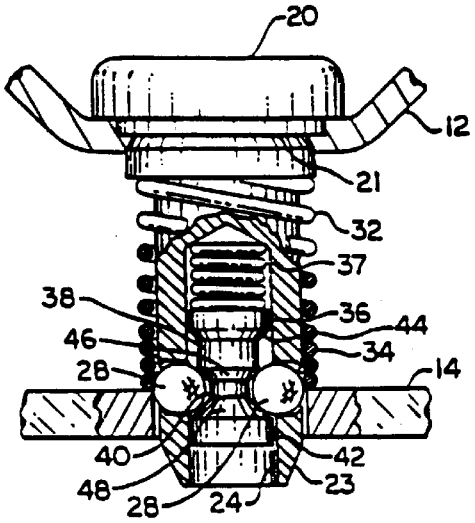
Figure 3C:
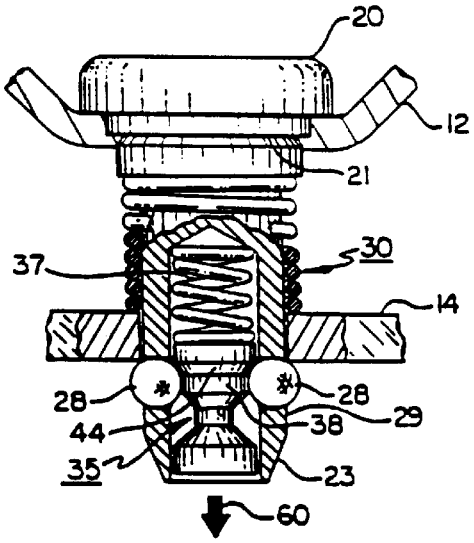

Fastener 10 comprises a stud 11 having a head 20 and a shank portion 22 with probe end 23, shank portion 22 having a hollow portion, or aperture, 24 formed therein as illustrated. A plurality of openings 26 (although only two holes are illustrated, one or more holes could be provided) are formed in the shank portion 22. Positioned within the holes are corresponding hardened steel balls 28. Compression spring member 30 is formed around the outside surface of shank portion 22. As illustrated in FIG. 3(a), spring 30 is designed to have a portion 32 wherein the coils are diagonally wrapped around the shank portion and having a predetermined distance between each coil and a portion 34 wherein the spring members are formed in a close pattern about the holes 26 formed in the shank portion as illustrated. In this area of shank portion 22, the spring coils are adjacent to one another and the axis thereof is substantially aligned with the axis of the fastener 10 as illustrated. It should be noted that there is a section 21 under head 20 that is pressed into the panel member 12 securing the head of the fastener 20 to the panel member 12. It should be noted that head 20 and section 21 can be replaced with alternate configurations depending on the particular application for fastener 10, the only requirement being that a surface of sufficient dimensions be provided to engage one end of spring portion 32 since spring member 30 must be held in place on shank portion 22 during the fastener installation/removal process. This requirement can be met with a surface which is an integral part of fastener 10 or, for example, by a separate, adjacent plate member. Positioned within aperture 24 is a stepped pin 35 loaded (compression force applied thereto) by internal spring 37. Pin 35 comprises a series of cylindrical step portions 36, 38, 40 and 42 of differing diameters, joined by angled, or stepped, surface portions 44, 46 and 48, respectively, as illustrated. A hollowed end portion 49, or recess, in cylindrical portion 42 is provided to enable a driver access thereto for the reasons set forth hereinafter. Pin member 35 is loaded by spring 37 and held in place within aperture 24 by angular step 44 resting against ball members 28 (FIG. 3c).

Figure 3D:
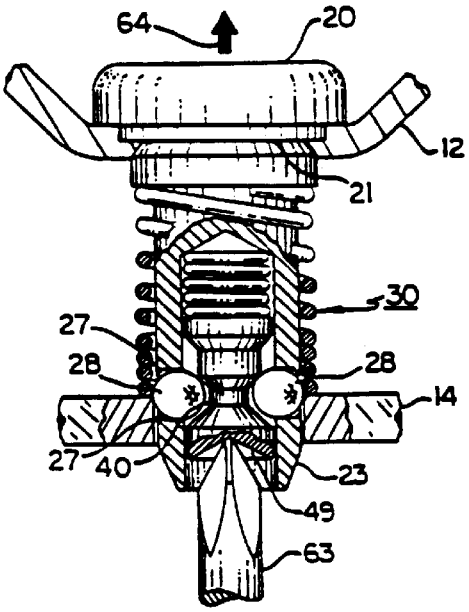

Ball members 28 are in the retracted position until usage, held there in place by portion 34 of spring 30. When fastener 10 is inserted into the aperture in panel member 14 as shown in FIG. 3(b), spring 30 is compressed back toward the head 20 of the fastener and moves away from ball members 28 it was initially forcing inward as shown in FIG. 3(a). As fastener 10 passes through aperture 15 formed in panel 14, the ball members are still in their retracted position because the diameter of the hole is approximately the same size as the inside diameter of spring 30 that once contained it. When fastener 10 passes completely through the aperture in panel 14 as shown in FIG. 3(c), spring portion 37 pushes the pin forward (in the direction of arrow 60), forcing the ball members 28 to expand in the radial direction thus securing the fastener to the panel member 14. As illustrated in FIG. 3(c), the spring 30 is now substantially compressed and internal spring 37 in its expanded position, pin member 35 being forced towards the probe end 23 of the shank portion of fastener 10. At this point, the bottom surface of the spherical ball members 28 are in contact with the surface of cylindrical portion 38 and angled surface 44 such that the ball members 28 have been forced to protrude from openings 26. The diameter of cylindrical portion 38 is selected such that ball members 28 protrude sufficiently to secure the fastener to panel member 14 yet provides enough available material adjacent openings 26 when the edges are staked to retain the ball members within aperture 24 notwithstanding large axial forces applied to pin 35. At this point spring 30 applies a compressive force (pre-load) to the rear surface of panel member 14 and the radially expanded locked ball members 28. It should be noted that during the initial fabrication of the fastener 10, the holes 26 in the shank portion 22 are first formed of a diameter greater than a diameter of the ball members 26. The internal spring member 37 and the pin member 35 are then placed in the aperture 24 within the shank portion 22 and the ball members 28 are then placed in the apertures in the position shown in FIG. 3(a). At this point a staking tool is used to reform, or stake, the edges of the holes 26 in an amount such that portion 27 of the holes 26 are smaller than the diameter of the ball members 28 thus preventing the ball members from exiting through the holes they are in, completing the installation. In order to remove plate member 12, a driver tool 63 is positioned in recess 49 of pin 35 and pin 35 is pushed axially toward head 20 in the direction of arrow 64 as shown in FIG. 3(d). This action compresses spring 37 and enables the balls 28 to move down the angled surface 46 adjacent cylindrical portion 40. This action is aided by compression spring 30 which also as, due to its ejection load, to move the fastener in the direction of arrow 64 and thus to automatically eject the fastener panel member 14. As the ball members 28 retract to the proper depth, fastener 10 is ejected from the hole in panel member 14 enabling, in the application described, the airbag unit attached to support plate 12 to be removed. As the fastener is ejected, spring member 30 positions automatically itself over ball members 28 to maintain them in the retracted position, enabling the fasteners to be reused.

It is apparent that the inner stepped pin 35 in the embodiment shown in the previous figures is restrained from exiting aperture 24 by the interference of the ball members 28. As described hereinabove, the balls are captivated to the fastener by a staking process on the exterior shank portion of the pin. The location of the stepped pin against the ball can result in a major mechanical advantage causing the ball members 28 to be ejected from openings 26 if a sufficient load is applied axially to the inner stepped pin 35 when the airbag detonates. This load can force the balls radially outward and against the captivating staking portion, pushing the staked material away and allowing the ball members 28 to leave its original confines and also allowing the inner stepped pin 35 and spring 37 to exit their original location within aperture 24.

Figure 4A:
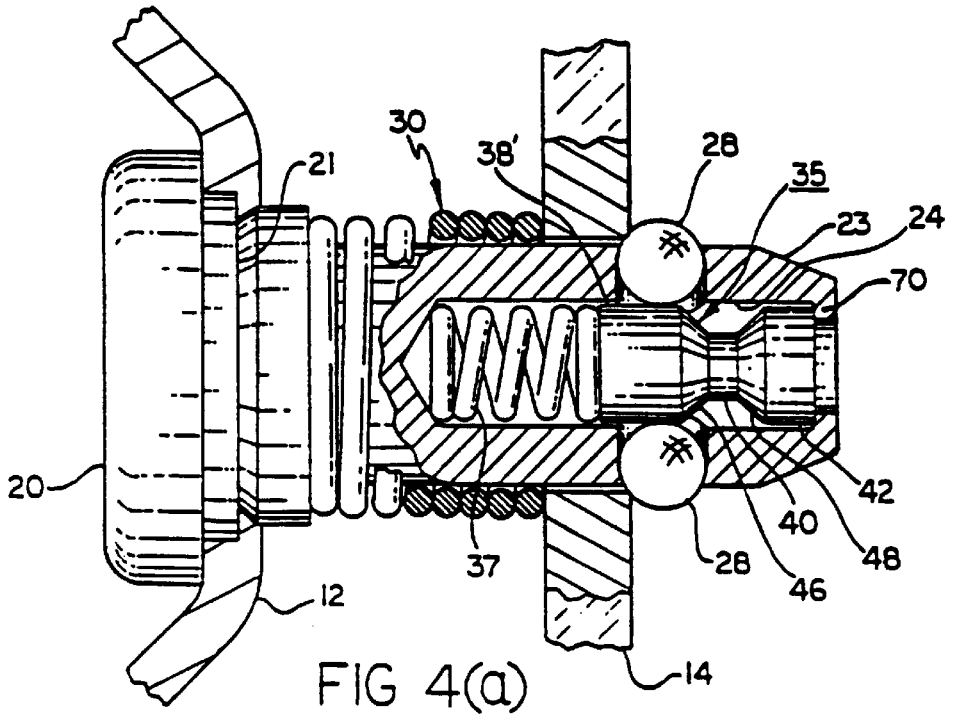
FIGS. 4(a) and 4(b) illustrate another embodiment of the fastener of the present invention.
Figure 4B:
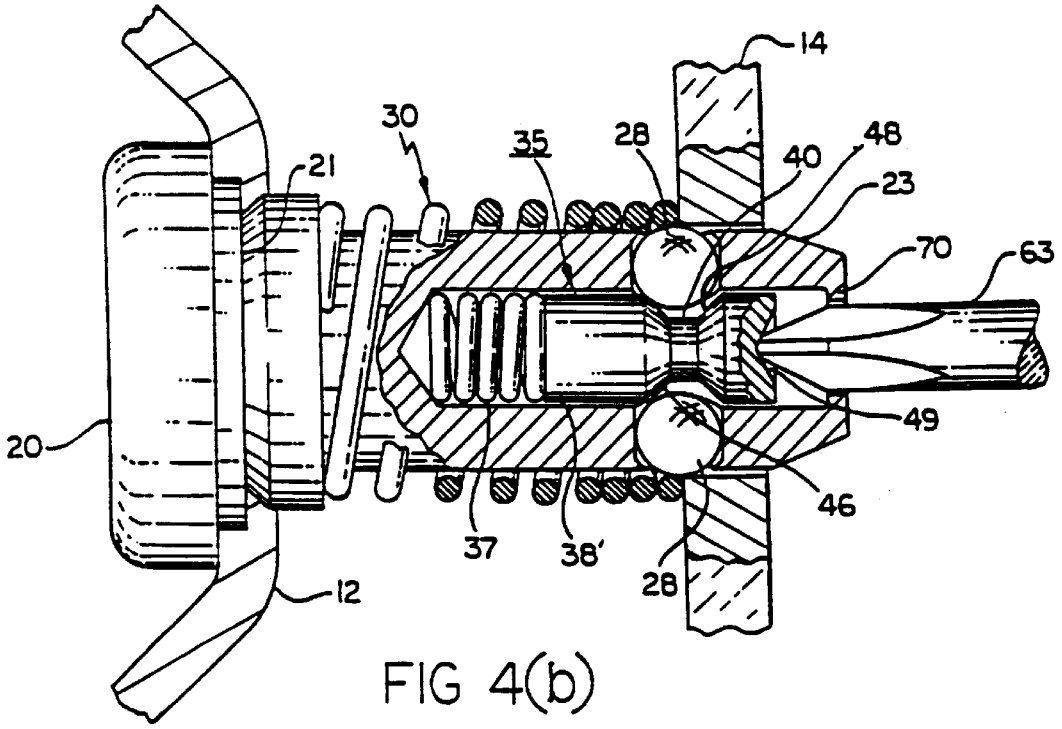

Referring now specifically to FIGS. 4(a) and 4(b), the radial loading of the ball members 28 are eliminated by removing the inner pin retainer step portion 36. (The same reference numerals utilized in both embodiments describe identical components). FIG. 4(a) illustrates the captivating step of the installation process with ball members contacting cylindrical portion 38' (equivalent to FIG. 3(c)), FIG. 4(b) illustrating the release step with ball members 28 forced into the valley between surface portions 46 and 48, (equivalent to FIG. 3(d)). Therefore, any axial load or impact cannot affect the dislodging of the ball members 28. In this embodiment, the ball staking process is only concerned with just holding the ball members 28 in place and not the effect of the inner pin step member 44 reacting on it. To prevent the pin member 35 and spring 37 from exiting the pin, it is captivated by forming additional material, at the end of aperture 24 to a diameter that is smaller than the diameter of the pin member 35. As shown in the figures, the chamfered end 23 of the fastener has an angled portion 70, the resulting aperture diameter at this end of the fastener being smaller than the diameter of step portion 42. What is significant is the amount of material that can be used to captivate the pin member 35 which has considerably more mass than the ball staking process which is somewhat limited in displacing material. Also, the opportunity to create any mechanical advantage to activate the removal of the pin member 35 is eliminated by removing the pin retainer angular step 44 and extending cylindrical portion 38 to form cylindrical portion 38' as illustrated.

An additional technique for minimizing the radial type forces applied to ball members 28 if large axial forces are applied to pin member 35 is to increase the diameters of aperture 24 and cylindrical portion 36 and increase the angle of inclined portion 44. In this configuration, the contact point of the ball members 28 is such that the primary force applied thereto forces the ball members against the adjacent end portion 29 (FIG. 3(c)) instead of radially outward.

For the application noted hereinabove, the present invention allows an operator to quickly install the airbag unit from the driver's side, probe end 23 being chamfered to allow easy alignment. The operator takes the airbag assembly on panel 12 and presses it towards the matching plate where the fasteners are inserted into the mating holes. As the operator continues to push inward toward the steering wheel, an audible click is heard which signifies installation is complete. In this application, the fastener of the present invention does not require the steering wheel to be rotated. To remove the unit, a small diameter tool, like a crosspoint screwdriver, simply be inserted into the end of the fastener opposite the head to engage the center pin therein. When the center pin is pushed or depressed, the ball members retract and the outer spring assists in the quick ejection of the steering wheel plate. What is more important, no rotational loosening or tightening is required because there are no threaded portions. In contradistinction thereto, current procedure requires the operator to rotate the steering wheel, use special tools and work behind the wheel and dashboard screws for assembly. The operator must first locate and then install four and remove screws and their associated nuts.

Although particularly adapted for use in airbag installations as described above, the fastener of the present invention can be used in other applications requiring pushbutton type fasteners, the pushbutton fastener of the present invention being less complicated and less expensive than prior art devices because there are fewer parts required for its operation. The release operation is very simple and as noted hereinabove and is accomplished by accessing the far end of the fastener, an arrangement which is required in many applications. In addition, after release, the fastener is available for reuse in the field.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt to a particular situation or material the teaching of the invention without departing from its essential teachings.

What is claimed is:

1. A push button type fastener comprising:

an elongated shank having a first end terminating in a second end spaced from said first end;

means defining an aperture extending inwardly from said second end of said elongated shank along the longitudinal axis of said elongated shank;

means defining an opening in said elongated shank that connects said aperture to the outside surface of said elongated shank;

a retention member, having first and second surface portion, positioned in said opening;

a first spring positioned about the outside surface of said elongated shank, wherein said first spring has a first portion positioned in contact with said first surface portion of said retention member;

a pin positioned within said aperture;

a second spring applying a compressive force to said pin, wherein said pin has an end facing said second end of said elongated shank and is in contact with said second surface portion of said retention member.

2. The fastener as set forth in claim 1 wherein said pin comprises a plurality of cylindrical portions of differing diameters, each cylindrical potion being separated by an angled surface.

3. The fastener as set forth in claim 1 wherein the first portion of said first spring that is in contact with the first surface portion of said retention member forces said pin into a retracted position wherein first surface portion of said retention member is substantially coextensive with the surface of said shank.

4. The fastener of claim 1 wherein the first surface portion of said retention member protrudes from said opening when the first portion of said first spring is removed from contact with the first surface portion of said retention member.

5. The fastener of claim 4 wherein the second surface portion of said retention member is in contact with the surface of one of the cylindrical portions of said pin after installation of the fastener in a panel.

6. The fastener of claim 5 wherein the second surface portion of said retention member is in contact with an angled surface of said pin when the first portion of said first spring is removed from contact with the first surface portion of said retention member, the largest diameter of the second angled surface being greater than the largest diameter of first angled surface.

7. The fastener of claim 1 wherein said retention member comprises a spherical ball.

8. The fastener of claim 7 wherein the diameter of said opening adjacent the surface of said elongated shank is less than the diameter of the spherical ball.

9. The fastener of claim 1 wherein said pin has a recessed end accessible through said aperture for receiving a fastener release tool.

10. The fastener of claim 1 wherein the diameter of said opening adjacent the surface of said elongated shank is less than the diameter of said opening adjacent said aperture.

11. The fastener of claim 1 wherein the first portion of said first spring is in contact with said retention member after the fastener is released from a panel.

12. A push button type fastener comprising:

an elongated shank having a first end, a second end opposite the first end, and means defining an aperture extending into said elongated shank from the second end along the longitudinal axis of said elongated shank, means defining an opening in said elongated shank, near the second end of said elongated shank, that extends through said elongated shank to the aperture;

a retention member positioned in said opening, wherein said retention member is movable between a locked position and retracted position;

first spring means encircling said elongated shank and having a first portion disposed adjacent to the second end of said elongated shank and a second portion opposite the first portion, wherein said first spring means is movable between a compressed position and an expanded position;

holding means disposed adjacent to the first portion of said first spring means for holding said retention member in the retracted position when said first spring means is in the expanded position;

a pin axially positioned within the aperture in contact with said retention member, wherein said pin is axially movable between a retracted position in which said first spring means is in the expanded position and said holding means is holding said retention member in the retracted position, and a forward position in which said first spring means is in the compressed position and said retention member is in the locked position; and second spring means for biasing said pin to the forward position and wherein said holding means and said first spring means is a single coil spring.

13. The fastener of claim 12 wherein the diameter of the aperture at the second end of said elongated shaft is less than the diameter of that portion of said pin accessible through the aperture.

14. The fastener of claim 12 wherein said pin has a recessed end accessible through said aperture for receiving a fastener release tool.

15. The fastener of claim 14 wherein the fastener is released when the retention member assumes its retracted position upon application of sufficient force to said pin by a fastener release tool.

16. The fastener of claim 12 wherein the first end of said elongated shank terminates in a spring retainer.

17. The fastener of claim 16 wherein said first spring means applies force to the spring retainer to assist in the release of the fastener from a panel.

18. The fastener of claim 12 wherein said holding means is a plurality of coils in close proximity with one another that extend from the first portion of said first spring means.

*19. In combination with an automobile air bag module, an air bag fastener assembly comprising:*

*an air bag support plate having opposing front and rear faces and an aperture therethrough;*

*an elongated shank attached to the air bag module, the elongated shank being formed with an interior and including a probe end movable through the aperture in a first direction past said front face of said support plate, and the probe end of said elongated shank being formed with openings extending through said elongated shank to said interior;*

*opposing first and second retention members located within the interior of said shank; and*

*a resilient device acting to bias said retention members to extend through said openings to locations outside of said elongated shank, for engaging said rear face of said support plate, whereby said probe end is prevented from moving through said support plate in a second direction, opposite to said first direction.*

*20. The fastener assembly of claim 19 wherein each of said first and second retention members is a spherical ball.*

*21. The fastener assembly of claim 19 wherein movement of said elongated shank in the first direction past said front face of said support plate causes said first and second retention members to be disposed to engage said rear face of said support plate, to prevent passage of said probe end through said support plate in the second direction, opposite to the first direction.*

*22. The fastener assembly of claim 21 wherein:*

*said shank further includes a sprint retainer at an end opposite the probe end;*

*said fastener assembly further comprises a coil spring retained against the spring retainer and encircling said shank, extending toward the probe end;*

*the coil spring is movable between a compressed position and an expanded position; and*

*the coil spring applies a force to the spring retainer as the fastener assembly is released, to thereby assist in the release of the fastener assembly from the air bag support plate.*

*23. The fastener assembly of claim 19 wherein:*

*said elongated shank defines a longitudinal axis;*

*said resilient device includes a spring device located within the interior of said elongated shank;*

*said first and second retention members are biased radially outward by said resilient device to extend substantially perpendicular to the longitudinal axis of said elongated shank, through said openings to locations exterior of said elongated shank; and*

*wherein movement of said shank in the first direction past said front face of said support plate causes said retention members to be disposed adjacent to said rear face of said support plate, to prevent passage of said probe ends through said support plate, in the second direction, opposite to the first direction.*

*24. The fastener assembly of claim 19 wherein said resilient device is a spring.*

*25. The fastener assembly of claim 19 wherein said openings are two in number, and are arranged diametrically opposite each other.*

*26. The fastener assembly of claim 19 wherein:*

*said elongated shank includes a spring retainer that is positioned adjacent to a head end of the shank, opposite the probe end; and*

*said fastener assembly further comprises a coil spring that is compressed between the support plate and the head end upon insertion of said elongated shank through said support plate, the retention members preventing the bias of the coil spring from removing the elongated shank from said aperture until said retention members are compressed radially inward by a predetermined amount.*

*27. The fastener assembly of claim 26, wherein:*

*the coil spring also normally biases the first and second retention members radially inward, such that they together fit through the aperture; and*

*the coil spring can be selectively compressed to cause the first and second retention members to be urged radially outward, such that they do not together fit through the aperture.*

*28. In combination with an automobile air bag module, an air bag fastener assembly comprising:*

*an air bag support plate having first and second sides and an aperture therein with a predefined radial dimension;*

*a shank having a length in an axial dimension, a head at one end of its axial dimension, and a probe end at the other end of its axial dimension attached to the air bag module, the probe end being axially inserted through the aperture at the first side of the support plate, the probe end having radial dimensions such that it fits into the aperture;*

*a coil spring that is coaxial to the shank, and that has a larger radial dimension than the aperture, such that the coil spring does not fit through the aperture, but is compressed between the support plate and the head end of the shank as the probe end is selectively inserted through the aperture;*

*a resilient device; and*

*a retention mechanism that is urged by the resilient device to radially expand once the probe end has been inserted through the aperture, to thereby contact the second side of the support plate and prevent removal of the probe end through the aperture;*

*wherein the retention mechanism has a retracted position, in which it is radially constricted such that the retention mechanism fits into the aperture, and a locked position in which the retention mechanism is radially expanded and does not fit through the aperture.*

* * * * *